United States Patent

Mauney et al.

[11] Patent Number: 6,018,201
[45] Date of Patent: Jan. 25, 2000

[54] ELECTRICAL DISTRIBUTION SYSTEM FOR A MOTOR VEHICLE

[75] Inventors: Marcus H. Mauney, Fort Wayne, Ind.; Wes A. Nagara, Farmington Hills, Mich.

[73] Assignee: Ford Global Technologies, Inc., Dearborn, Mich.

[21] Appl. No.: 09/032,506

[22] Filed: Mar. 2, 1998

[51] Int. Cl.[7] .................................. F02N 11/06; H02P 9/04
[52] U.S. Cl. ................... 290/40 C; 290/40 R; 290/40 A; 290/40 B; 290/40 E
[58] Field of Search ................................ 290/40 A–40 F, 290/40 R; 320/39, 50; 324/522; 123/192.1, 32, 119

[56] References Cited

U.S. PATENT DOCUMENTS

| | | | |
|---|---|---|---|
| 4,177,770 | 12/1979 | Anderson | 123/32 EE |
| 4,188,598 | 2/1980 | Hunt | 333/207 |
| 5,105,776 | 4/1992 | Tsuchiya et al. | 123/192.1 |
| 5,426,416 | 6/1995 | Jefeeries et al. | 340/664 |
| 5,481,194 | 1/1996 | Schantz et al. | 324/522 |
| 5,581,171 | 12/1996 | Kerfoot et al. | 320/50 |

*Primary Examiner*—Elvin Enad
*Attorney, Agent, or Firm*—Mark S. Sparschu

[57] ABSTRACT

An electrical distribution system for a motor vehicle comprises an engine, an electrically-conductive structural portion of the vehicle and a battery having a positive terminal and a negative terminal. The system also includes a starter motor having an electrical current return electrically coupled to the engine and an electrical generator having an electrical current return electrically coupled to the engine. Also, the system comprises an electrical current return path from the structural portion to the engine and an electrical current return conductor electrically and mechanically coupled between the engine and the structural portion. In addition, the system contains a capacitor coupled in series with the electrical current return conductor. In a variation of the disclosed system, the connections to the structural portion of the vehicle are made to the body and/or chassis of the vehicle. Systems built to according to the present invention have been demonstrated to have very advantageous properties. Electrical noise induced in several sensitive portions of the electrical system, both through magnetic coupling and through electrical conduction, are reduced. Also, radio performance is enhanced.

14 Claims, 1 Drawing Sheet

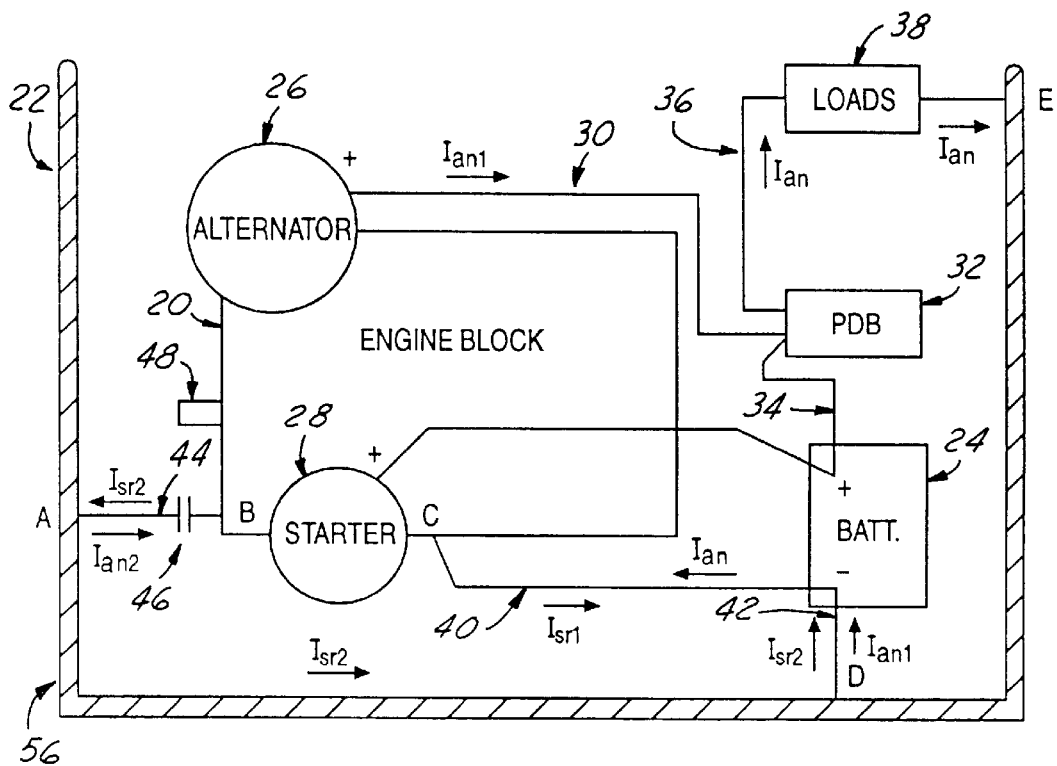
FIG. 1
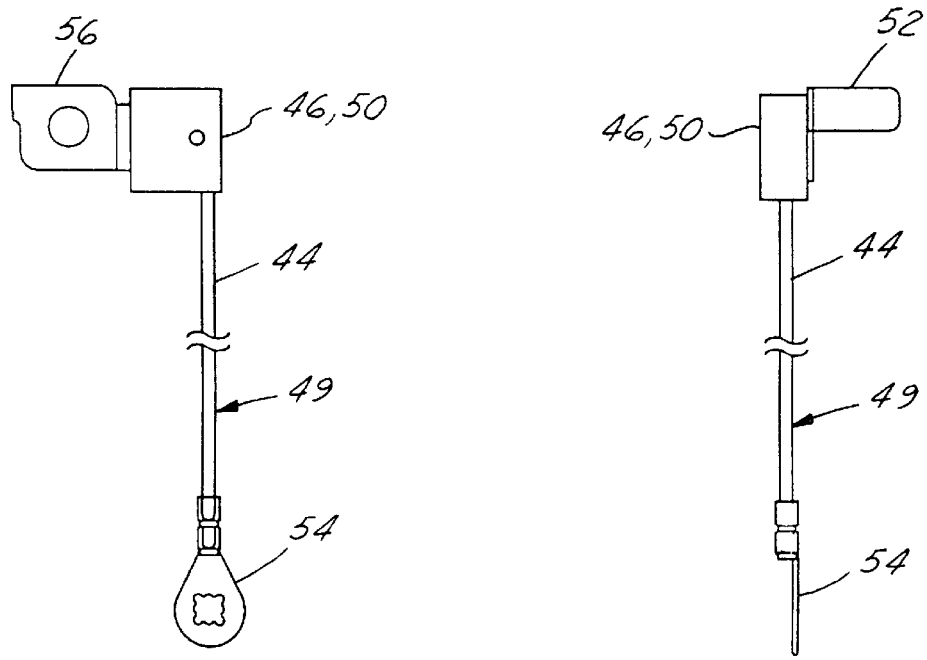
FIG. 2
FIG. 3

ELECTRICAL DISTRIBUTION SYSTEM FOR A MOTOR VEHICLE

BACKGROUND OF THE INVENTION

1. Field of the Invention

The present invention relates to electrical distribution systems for motor vehicles.

2. Description of the Related Art

In the design of an electrical distribution system for a motor vehicle, provision is made for both the supply and return of electrical current to and from the various electrical devices on the vehicle. Redundant return paths are often used in existing designs. For example, "ground straps" (braided uninsulated conductors) may be provided between the battery negative terminal and the vehicle body or chassis, between the battery negative terminal and the vehicle's engine block, and between the body or chassis and the engine block.

The design of the architecture of the various electrical current return paths should be carefully considered because otherwise electromagnetic interference noise may adversely affect the operation of some of the electrical components on the vehicle.

SUMMARY OF THE INVENTION

The present invention provides an electrical distribution system for a motor vehicle. The system comprises an engine, an electrically-conductive structural portion of the vehicle and a battery having a positive terminal and a negative terminal. The system also includes a starter motor having an electrical current return electrically coupled to the engine and an electrical generator having an electrical current return electrically coupled to the engine. Also, the system comprises an electrical current return path from the structural portion to the engine and an electrical current return conductor electrically and mechanically coupled between the engine and the structural portion. In addition, the system contains a capacitor coupled in series with the electrical current return conductor.

In a variation of the present invention, the connections to the structural portion of the vehicle are made to the body and/or chassis of the vehicle.

Systems built to according to the present invention have been demonstrated to have very advantageous properties. Electrical noise induced in several sensitive portions of the electrical system, both through magnetic coupling and through electrical conduction, are reduced. Also, radio performance is enhanced.

BRIEF DESCRIPTION OF THE DRAWINGS

FIG. 1 is a schematic diagram showing a portion of the electrical distribution system of a motor vehicle.

FIGS. 2 and 3 are two views of a combined conductor/capacitor assembly 48 which includes conductor 44 and capacitor 46 of FIG. 1.

DETAILED DESCRIPTION OF THE PREFERRED EMBODIMENT

Refer first to FIG. 1. There is schematically shown a portion of an electrical distribution system for a motor vehicle. The vehicle includes an engine, which has an engine block 20, and a chassis 22. The vehicle also includes a battery 24 having a positive terminal (+) and a negative terminal (−).

Mounted to the engine are an alternator 26, having a positive output terminal (+), and a starter motor having a positive input terminal (+). Alternator 26 and starter motor 28 do not have negative terminals per se. Instead, electrical current returns for each of these components are through their metallic housings, which are in electrical contact with engine block 20.

The output current from alternator 26 is routed via a conductor 30 to a power distribution box 32. Power distribution box 32 has internal conductors which make suitable connections to provide alternator current via conductor 34 to battery 24 and via conductor 36 to electrical loads 38. Electrical loads 38 include the various electrical loads on a motor vehicle such as, for example, radio, lights, power windows, etc. Power distribution box 32 is a component known to those skilled in the art and used to facilitate power distribution and reduce wires in the vehicle.

Coupled between engine block 20 and the negative terminal of battery 24 is an electrical return conductor 40. Conductor 40 may be an insulated wire or a more conventional braided "ground strap". Also, coupled between chassis 22 and the negative terminal of battery 24 is a second electrical return conductor 42.

Coupled between chassis 22 and engine block 20 is a third current return conductor 44. Included in series with current return conductor 44 is a capacitor 46. The inclusion of capacitor 46 solves at least two identified problems, as will now be described.

First, when the engine of the vehicle is being cranked, starter motor 28 draws current via conductor 47 from battery 24. Return current from starter motor 28 flows in two paths. One path is via conductor 40 (labelled $I_{sr1}$ in FIG. 1). The other path is via conductor 44 to point "A", through chassis 22 to point "D", and through conductor 42 to the negative terminal of battery 24. When conductor 44 is routed in proximity to an important engine sensor, such a crankshaft position sensor 48, magnetic coupling of starter motor noise currents occurs between conductor 44 and crankshaft position sensor 48. This can inhibit the ability of the engine to start, resulting in longer cranking times. The inclusion of capacitor 46 blocks the relatively low-frequency starter motor return noise currents, instead causing any such currents to flow more innocuously through conductor 40.

Second, the inclusion of capacitor 46 reduces alternator ripple noise voltages which are developed across loads 38. Alternator 26 does not produce pure DC electrical energy; instead, the output of alternator 26 has a relatively low-frequency "ripple" on it, due to rectification of the three-phase electrical energy generated by the alternator. The "ripple" is manifested as a ripple noise current $I_{an}$ which flows to loads 38 and then is returned to alternator 26 via two paths, $I_{an1}$ and $I_{an2}$. The two paths in parallel have very low impedance. Therefore a very large fraction of noise voltages generated by ripple noise current $I_{an}$ are developed across loads 38. These noise voltages can cause conducted electromagnetic interference (EMI) concerns regarding the proper operation of some of loads 38, particularly electronic devices.

With the inclusion of capacitor 46, however, the low-frequency impedance between loads 38 and engine block 20 is increased (because the low-frequency impedance of the path for $I_{an2}$ is increased). Thus, a lesser fraction of the noise voltage attributable to $I_{an}$ is developed across loads 38. The EMI concerns are thereby reduced.

Preferably, capacitor 46 is sized such that when considered with the inductance of conductor 44, the series L-C impedance resonates (i.e., has a minimum impedance) near frequencies where a very low-impedance ground is important for good radio reception. For AM reception, this is approximately 500 kHz. Due to the resonance of the L-C combination, the inclusion of capacitor 46 allows for a lower impedance to be provided at frequencies of interest than with a simple grounding conductor alone. Additional capacitors and conductors can be added in parallel to capacitor 46 and conductor 44 for other frequencies of interest.

Conductor 44 can be sized with relatively small cross-sectional area because of the inclusion of capacitor 46. Generally, conductor 44 would be sized to be able to tolerate large direct-current fault currents. Such fault currents could be caused by, for example, loss of integrity of electrical connections between the battery negative terminal and the engine or chassis. However, with the inclusion of capacitor 46, large DC currents are blocked. Therefore, the cross-sectional area of conductor 44 can be relatively small.

The preferred packaging for conductor 44 and capacitor 46 is in a combined assembly 49, as shown in FIG. 2. Conductor 44 is preferably a 14 gauge wire. Capacitor 46 is molded into a plastic portion 50. Also molded into plastic portion 50 is a terminal 52 for attachment to engine 20. At the other end of conductor 44 is an eyelet terminal 54 for connection to chassis 22. The use of a relatively small-gauge conductor 44, especially one of insulated rather than braided construction, makes packaging of conductor 44 easier than packaging a larger and more abrasive braided ground strap. An additional conductor and capacitor parallel to conductor 44 and capacitor 46, if desired, can be included in assembly 49.

It should be noted that in some vehicle electrical architectures, some or all of the connections denoted as points A, B and E in FIG. 1 may be made to the vehicle body 56 instead of chassis 22. In either environment the present invention may be used to advantage.

By way of example, some of the mounting points used by the inventors for terminal 52 are to the housing of alternator 26 and to engine block 20. Some of the mounting points used for eyelet terminal 54 are to the vehicle's radiator support and to one of the vehicle's shock-absorber-mounting towers.

The electrical distribution design described herein has been shown to very significantly reduce noise coupled to crankshaft position sensor 48 and noise developed across electrical loads 38. Further, radio reception test results are very positive.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electrical system for a motor vehicle, said system comprising:
   an engine;
   an electrically-conductive structural portion of said vehicle;
   a battery having a positive terminal and a negative terminal;
   a starter motor having an electrical current return electrically coupled to said engine;
   an electrical generator having an electrical current return electrically coupled to said engine;
   an electrical current return path from said structural portion to said engine;
   an electrical current return conductor electrically and mechanically coupled between said engine and said structural portion; and
   a capacitor coupled in series with said electrical current return conductor.

2. An electrical system as recited in claim 1, wherein said structural portion is a chassis of said motor vehicle.

3. An electrical system as recited in claim 1, wherein said structural portion is a body of said motor vehicle.

4. An electrical system as recited in claim 1, wherein said electrical current return path further comprises:
   a second electrical current return conductor, said second electrical current return conductor electrically and mechanically coupled between said engine and said battery negative terminal; and
   a third electrical current return conductor, said third electrical current return conductor electrically and mechanically coupled between said battery negative terminal and said structural portion.

5. An electrical system as recited in claim 4, wherein said structural portion is a chassis of said motor vehicle.

6. An electrical system as recited in claim 4, wherein said structural portion is a body of said motor vehicle.

7. An electrical system as recited in claim 1, wherein said electrical current return conductor and said capacitor are included in a single sub-assembly.

8. An electrical system as recited in claim 1, wherein:
   said electrical system further includes a radio having at least one radio signal reception frequency range; and
   said capacitor and said electrical current return conductor are selected to have a resonant frequency within said radio signal reception frequency range.

9. An electrical system as recited in claim 4, wherein:
   said electrical system further includes a radio having at least one radio signal reception frequency range; and
   said capacitor and said electrical current return conductor are selected to have a resonant frequency within said radio signal reception frequency range.

10. An electrical system for a motor vehicle, said system comprising:
    an engine;
    a body;
    a chassis;
    a battery having a positive terminal and a negative terminal;
    a starter motor having an electrical current return electrically coupled to said engine;
    an electrical generator having an electrical current return electrically coupled to said engine;
    an electrical current return path from said body or said chassis to said engine;
    an electrical current return conductor electrically and mechanically coupled between said engine and said body or said chassis; and
    a capacitor coupled in series with said electrical current return conductor.

11. An electrical system as recited in claim 10, wherein said electrical current return path further comprises:
    a second electrical current return conductor, said second electrical current return conductor electrically and mechanically coupled between said engine and said battery negative terminal; and a third electrical current return conductor, said third electrical current return conductor electrically and mechanically coupled between said battery negative terminal and said body or said chassis.

12. An electrical system as recited in claim 11, wherein said electrical current return conductor and said capacitor are included in a single sub-assembly.

13. An electrical system as recited in claim 10, wherein:

said electrical system further includes a radio having at least one radio signal reception frequency range; and said capacitor and said electrical current return conductor are selected to have a resonant frequency within said radio signal reception frequency range.

14. An electrical system as recited in claim 11, wherein:

said electrical system further includes a radio having at least one radio signal reception frequency range; and said capacitor and said electrical current return conductor are selected to have a resonant frequency within said radio signal reception frequency range.

* * * * *